United States Patent
Ragusa

(10) Patent No.: US 7,540,521 B2
(45) Date of Patent: Jun. 2, 2009

(54) TOW-BAR FOR WHEELBARROWS

(76) Inventor: Thomas Marion Ragusa, 121 Keeter Cir., Wake Forest, NC (US) 27857

( * ) Notice: Subject to any disclaimer, the term of this patent is extended or adjusted under 35 U.S.C. 154(b) by 0 days.

(21) Appl. No.: 11/810,676

(22) Filed: Jun. 7, 2007

(65) Prior Publication Data

US 2008/0238034 A1    Oct. 2, 2008

Related U.S. Application Data

(60) Provisional application No. 60/896,946, filed on Mar. 26, 2007.

(51) Int. Cl.
B62B 1/20 (2006.01)
(52) U.S. Cl. .................... 280/415.1; 280/47.31
(58) Field of Classification Search ............ 280/30, 280/415.1, 503, 402, 204, 292, 653, 656, 280/63, 47.26, 47.31, 47.315, 47.32
See application file for complete search history.

(56) References Cited

U.S. PATENT DOCUMENTS

| | | | | |
|---|---|---|---|---|
| 3,494,667 | A * | 2/1970 | Schlapman | ............ 298/5 |
| 4,052,079 | A | 10/1977 | Lehman | |
| 4,155,678 | A | 5/1979 | Lehman et al. | |
| 4,281,950 | A | 8/1981 | Lehman et al. | |
| 4,417,754 | A * | 11/1983 | Yamaji et al. | ............ 285/104 |
| 4,740,008 | A | 4/1988 | Johnson | |
| 4,789,171 | A | 12/1988 | Porter | |
| 5,031,926 | A | 7/1991 | Wannamaker | |
| 5,087,061 | A | 2/1992 | Wallace | |
| 5,395,163 | A * | 3/1995 | Mandell et al. | ............ 298/38 |
| 5,458,356 | A | 10/1995 | Fedorko et al. | |
| 5,509,681 | A * | 4/1996 | Keller | ............ 280/415.1 |
| 5,915,706 | A * | 6/1999 | Mosley | ............ 280/47.26 |
| 7,140,630 | B2 * | 11/2006 | Abel | ............ 280/292 |
| 2007/0085284 | A1 * | 4/2007 | Loudon | ............ 280/47.34 |

* cited by examiner

Primary Examiner—Anne Marie M. Boehler
(74) Attorney, Agent, or Firm—Joseph L. Spiegel; Heslin Rothenberg Farley & Mesiti PC

(57) ABSTRACT

A tow bar assembly for converting a two-wheeled wheelbarrow into a garden or industrial type trailer includes a bar of metal box tubing with horizontal holes at the wheelbarrow end and vertical holes at the tractor end. The wheelbarrow end is slid onto the axle of the wheelbarrow, keeping the bar between the tub of the wheelbarrow and its toe plate. Grommets positioned on the axle on either side of the bar center the tow bar assembly on the axle. A threaded post is inserted into the holes in the tractor end of the bar and locked into place by nuts. In use, the handles of the wheelbarrow are raised and the post inserted into the aperture of the tractor's draw bar from the underside of the aperture. The cantilevered weight of the wheelbarrow will keep the wheelbarrow from becoming disengaged from the garden tractor or towing vehicle. The legs of the wheelbarrow are kept off the ground and the trailer-barrow is now ready for use. Where the wheelbarrow conversion to a trailer is intended for heavy loads, a piece of flat iron is attached to the topside of the rails of the wheelbarrow close to its dumping end. In this way, when in use, the tow bar will rest on the flat iron instead of the wheelbarrow's toe bracket.

9 Claims, 3 Drawing Sheets

TOW-BAR FOR WHEELBARROWS

CROSS-REFERENCE TO RELATED APPLICATION

The present application is related to Provisional Application Ser. No. 60/896,946 filed 26 Mar. 2007. This prior application is incorporated herein by this reference and the benefit of its filing date is claimed herein as well.

BACKGROUND OF THE INVENTION

1. Field of the Invention

This invention relates to wheelbarrows, and, in particular to the converting of wheelbarrows into garden or industrial type trailers. In general, wheelbarrows are designed to be manually lifted and moved. The present invention 1 allows for any two-wheeled wheelbarrow to be attached to the rear of any ATV, riding lawn mower, or tractor thereby eliminating the manual labor.

2. Description of the Prior Art

The prior art has come up with various arrangements for utilizing a wheelbarrow as a garden or industrial trailer, for carrying such loads as the wheel barrow is designed to be pulled by a towing vehicle such as an ATV, riding lawn mower, or tractor.

Thus, by way of example, in Lehman, U.S. Pat. No. 4,052,079, Lehman et al., U.S. Pat. No. 4,155,678, Lehman, et al. U.S. Pat. No. 4,281,950 and Wannamaker, U.S. Pat. No. 5,031,926, the wheelbarrow is received and rested or fixed to a dolly, which, in turn, is coupled to a towing vehicle such as a conventional garden tractor. It can be seen that an additional piece of equipment is required, i.e. a dolly, there is no quick means of attachment/detachment to the towing vehicle and an additional hand operation is required to install/remove a pin for securement/detachment to/from the towing vehicle. Also, the wheelbarrow ends up being towed in a rearward direction.

Johnson, U.S. Pat. No. 4,740,008, and Porter, U.S. Pat. No. 4,789,171 disclose two-wheeled wheelbarrows that may be converted to a trailer and in which a tow bar is integrated into the wheelbarrow's handles. As with Lehman, there is no quick means of attachment/detachment to the towing vehicle, an additional hand operation is required to install/remove a pin for securement/detachment to/from the towing vehicle and the wheelbarrow ends up being towed in a rearward direction.

Wallace, U.S. Pat. No. 5,087,061 discloses a two-wheeled wheelbarrow that is convertible to a trailer via a tow bar extender detachably connected to a permanently affixed tow bar beneath the pan of the wheelbarrow. There is no quick means of attachment/detachment to the towing vehicle, an additional hand operation is required to install/remove a pin for securement/detachment to/from the towing vehicle and the wheelbarrow ends up being towed in a rearward direction.

Finally, Fedorko, U.S. Pat. No. 5,458,356 discloses a two-wheeled wheelbarrow that is convertible to a trailer via a tow bar that is attached to the bottom of the wheelbarrow's body or pan, attached to the legs by a cross piece and is coupled to a lawn tractor. There is no quick means of attachment/detachment to the towing vehicle, an additional hand operation is required to install/remove a pin for securement/detachment to/from the towing vehicle and the wheelbarrow ends up being towed in a rearward direction.

In reviewing the prior art, it will be appreciated that a need still exists for the means whereby a wheelbarrow may be quickly and simply converted to a garden or industrial type trailer and without modification of the wheelbarrow.

SUMMARY

An object of the invention is the conversion of a two-wheeled wheelbarrow into a garden or industrial type trailer.

Another object is the ability to perform such a conversion without any modification of the wheelbarrow itself.

Still another object is a secure attachment/detachment of the wheelbarrow to a towing vehicle.

A further object is a quick attachment/detachment of the wheelbarrow to the towing vehicle.

These and other objects, features and advantages are accomplished in accordance with the teachings of the present invention, one illustrative embodiment of which comprises a tow bar assembly for converting a two-wheeled wheelbarrow into a garden or industrial type trailer that includes a bar of metal box or round tubing with horizontal holes at the wheelbarrow end and vertical holes at the tractor end. The wheelbarrow end is slid onto the axle of the wheelbarrow, keeping the bar between the tub of the wheelbarrow and its toe plate. Grommets positioned on the axle on either side of the bar center the tow bar assembly on the axle. A threaded post is inserted into the holes in the tractor end of the bar and locked into place by nuts. In use, the handles of the wheelbarrow are raised and the post inserted into the aperture of the tractor's draw bar from the underside of the aperture. The cantilevered weight of the wheelbarrow keeps the wheelbarrow from becoming disengaged from the garden tractor or towing vehicle. The legs of the wheelbarrow are kept off the ground and the trailer-barrow is now ready for use. Where the wheelbarrow conversion to a trailer is intended for heavy loads, a piece of flat iron is attached to the topside of the rails of the wheelbarrow close to its dumping end. In this way, when in use, the tow bar will rest on the flat iron instead of the wheelbarrow's toe bracket.

BRIEF DESCRIPTION OF THE DRAWING

Other objects, features and advantages of the present invention will be apparent from the following detailed description and accompany drawing, wherein.

DETAILED DESCRIPTION

Figure 1:
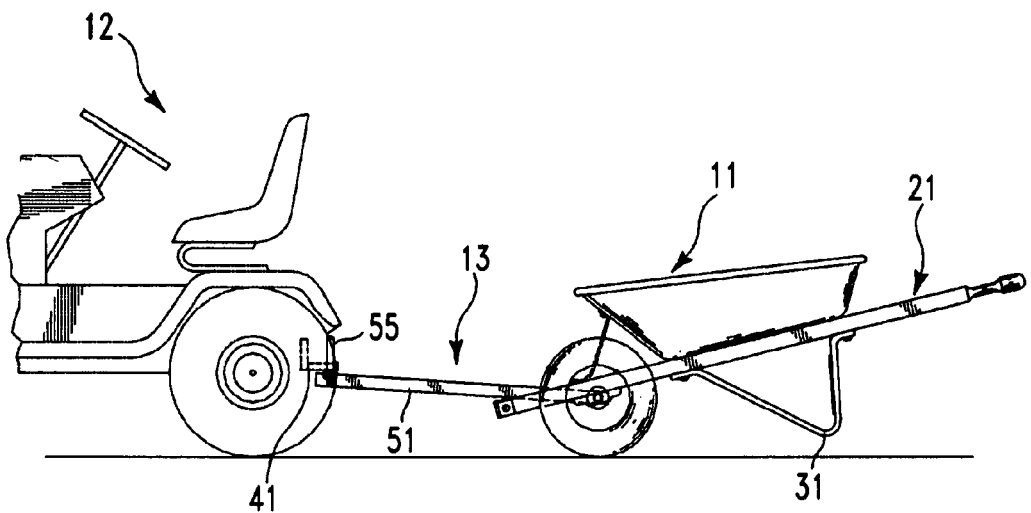
FIG. 1 is a partial side elevation view of a wheelbarrow being towed by garden tractor utilizing the novel tow bar assembly of the present invention.
Figure 1A:
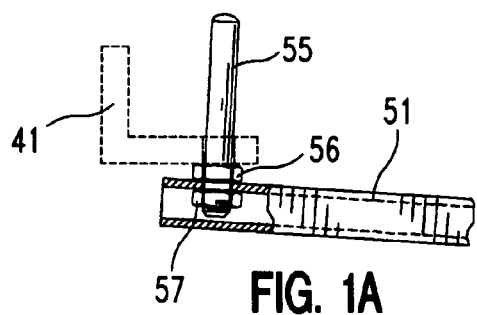
FIG. 1A is a partial side view, partly in phantom, of the tow bar assembly where joined to the garden tractor.

Referring now to FIG. 1. of the drawing, a two-wheeled wheel barrow 11 is shown being used as a trailer attached to a typical garden tractor 12 by means of the novel tow bar assembly 13 of the present invention. Only so much of the wheelbarrow 11 and garden tractor 12 are shown as is necessary for an understanding of the present invention.

Figure 2:
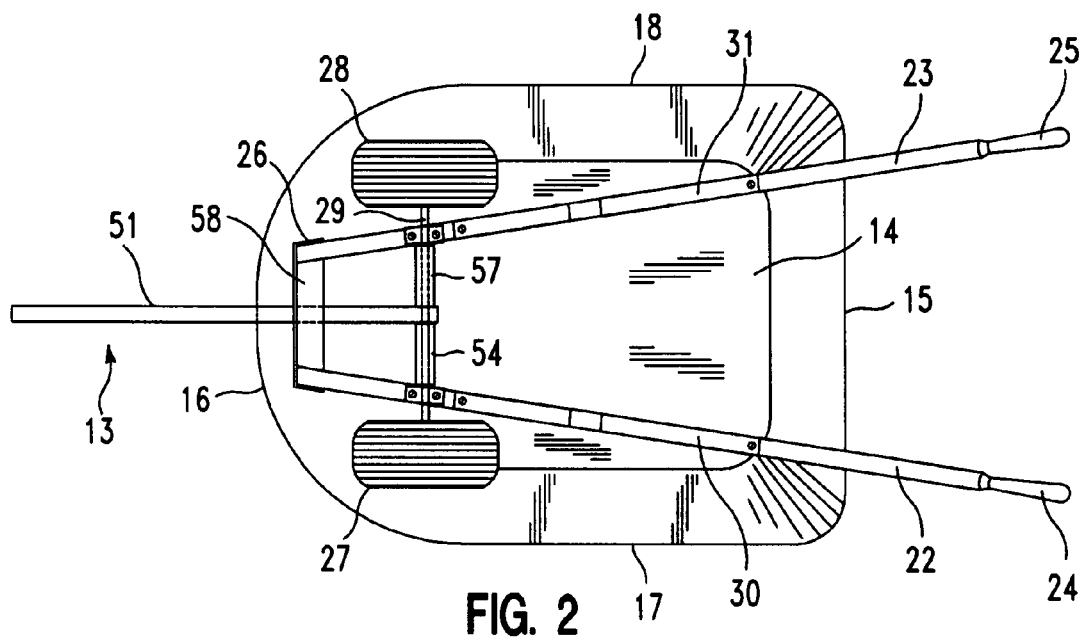
FIG. 2 is a bottom view of the wheelbarrow.
Figure 3:
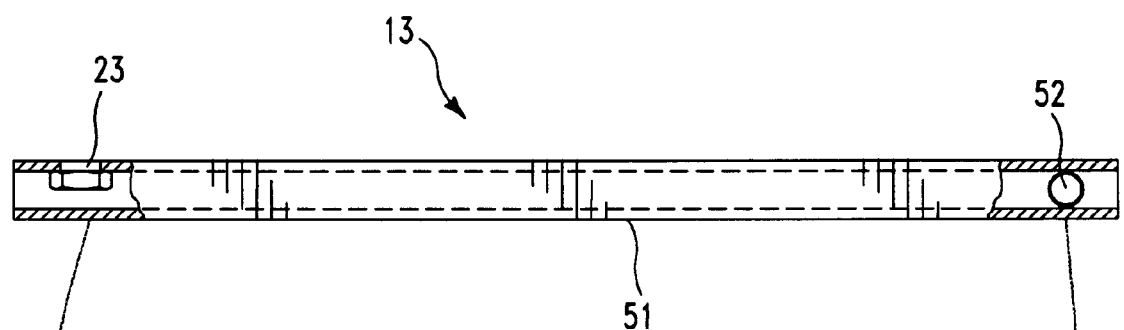
FIG. 3 is a side view, partially cut away, of the bar of the tow bar assembly.

The wheelbarrow 11 is shown (FIGS. 1 and 2) as having a body or tub 14 with workman's end 15 and dumping end 16 and sidewalls 17, 18.

The frame 21 of the wheelbarrow upon which the body 14 is supported includes a pair of wooden lower rails 22, 23 with lifting/supporting handles 24, 25 forward of the workman's end 15. The wooden rails 22, 23 extend and converge from forward of the workman's end 15, beneath the body 14 to the dumping end 16. The wooden rails 22, 23 are connected at their dumping end 16 by a toe plate 26. A pair of tired wheels 27, 28 is placed on an axle 29 supported on the rails 22, 23 towards the dumping end 16. Also attached to the rails is a pair of legs 30, 31.

The tractor 12 is seen as having a draw bar 41 at its rear (FIGS. 1, 1A and 7) with a standard one half to five eights inch hole 'specifically for the attachment of accessories. In accordance with the teachings of the present invention, one starts with a bar 51, for example, a two foot long piece of inch and a quarter by inch and a quarter by 16 gauge box tubing (FIGS. 1, 1A, 2, 3, 7 and 8). Holes 52, 53, typically five eighths of an inch in diameter are drilled through the bar, horizontally at the wheelbarrow end of the bar and vertically through the tractor end of the bar.

Figures 4, 5, 6:
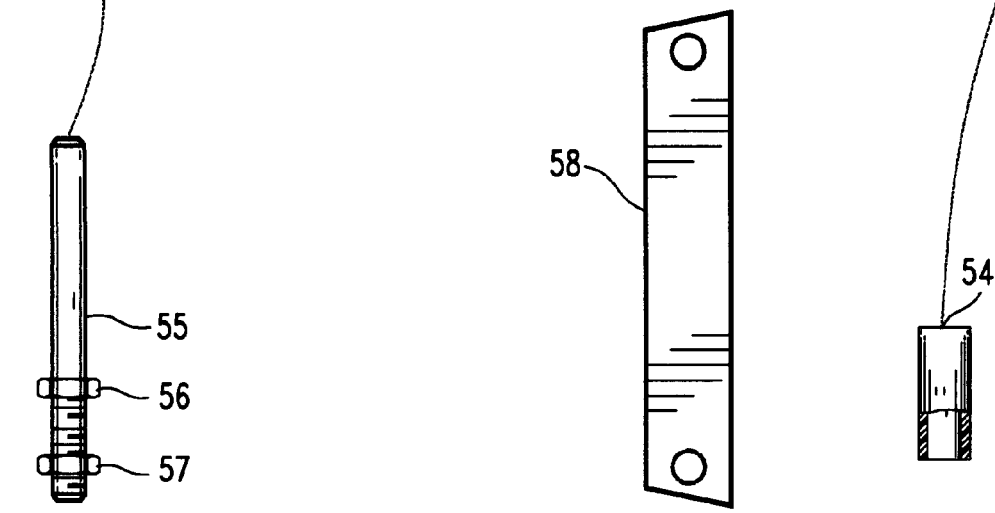
FIG. 4 is a side view of a threaded post, with nuts, used in securing the tow bar assembly to the draw bar of the tractor.
FIG. 5 is a top view of a flat iron piece for attachment to the front of the wheelbarrow above its toe plate and used when hauling heavy loads.
FIG. 6 is a side view, partially cut away, of a grommet to be mounted on the axle of the wheelbarrow on either side of the tow bar for centering the tow bar on the axle.
Figure 7:
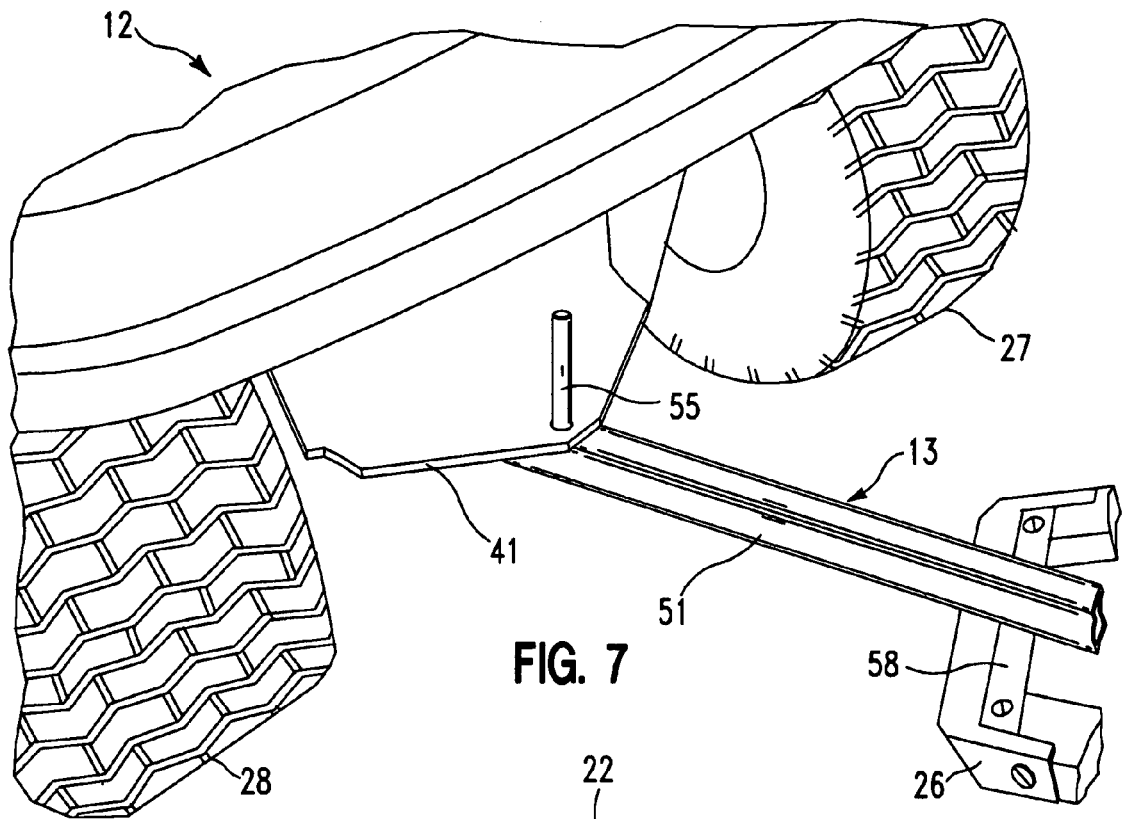
FIG. 7 is a partial perspective view of the tow bar assembly where attached to the tractor draw bar; and, FIG. 8 is a partial perspective view of the tow bar assembly where joined to the axle of the wheelbarrow.
Figure 8:
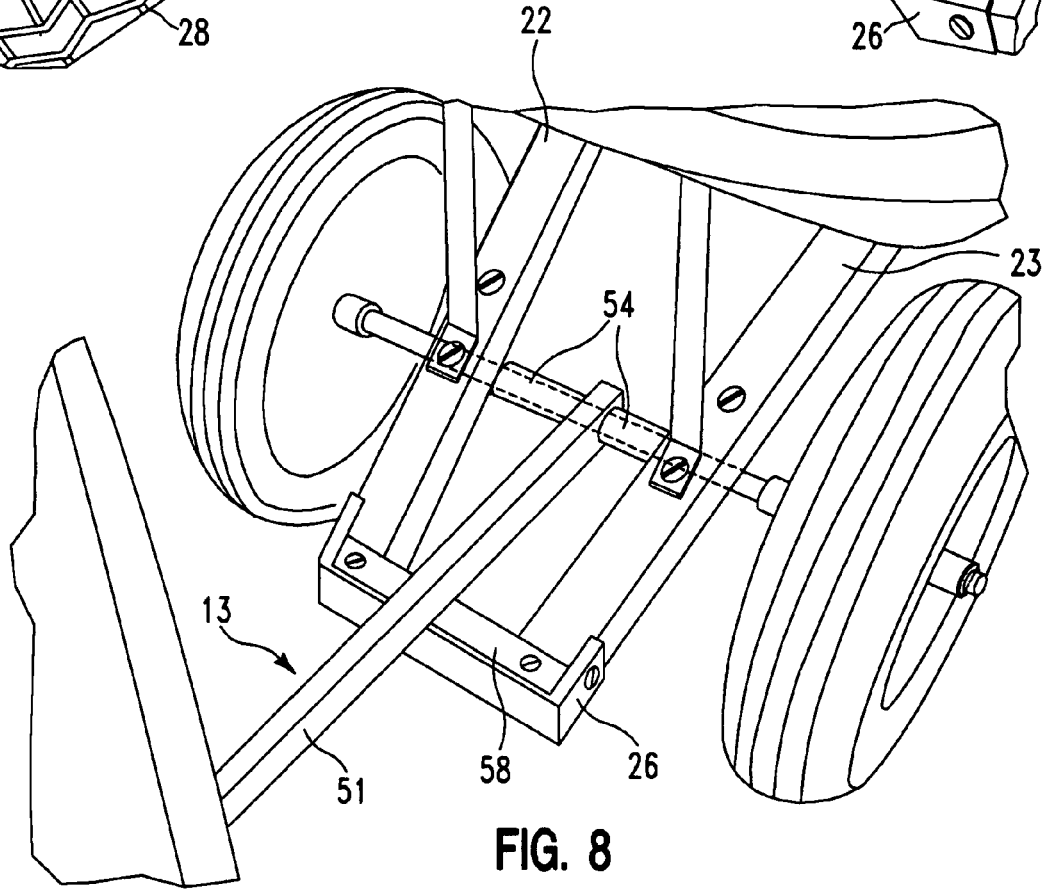

The tow bar assembly 13 is installed on the wheelbarrow by turning the wheelbarrow upside down, removing one of the wheels 27, 28 by removing a cotter pin using ordinary pliers. The axle 29 is slid halfway out. A grommet 54 (FIG. 6) is then slid onto the axle 29. The wheelbarrow end of the bar 51 is then slid onto the axle 29, but keeping the tow bar 51 between the toe plate 26 and the body 14 of the wheelbarrow 11.

A second grommet 54 is then slid onto the axle. The grommets 54 perform the function of centering the tow bar 51 on the axle 29. The axle 29 is then slid back in place, the removed wheel 27 or 28, is reattached and the wheelbarrow 11 righted.

A threaded post 55 (FIGS. 1A, 4 and 7) is then inserted in the hole 53 at the tractor end of the bar and securely and permanently locked in place to the bar by a pair of one half inch nuts 56, 57. This post's height will be sufficient to keep the wheelbarrow attached to its towing vehicle, as it bounces along during towing.

In use, the handles 24, 25 of the wheelbarrow are raised and the post 55 is inserted into the aperture of the draw bar 41 from the underside of the aperture. The cantilevered weight of the wheelbarrow keeps the wheelbarrow 11 from becoming disengaged from the garden tractor or towing vehicle 12. The legs 30, 31 of the wheelbarrow 11 are kept off the ground, approximately four inches. The trailer-barrow 11 is now ready for use. Where the wheelbarrow conversion to a trailer is intended for heavy loads a piece of flat iron 58 is attached to the top-side of the rails 22, 23 close to the dumping end 16 of the wheelbarrow 11. In this way, when in use, the tow bar will rest on the flat iron 58 instead of the wheelbarrow's toe bracket.

The present invention is of simple design, uses minimal material and can be used with any two-wheeled wheelbarrow.

Its cantilevered feature lessens weight at the point of attachment on the towing vehicle. Unlike prior art assemblies the instant tow bar assembly attaches to or coordinates with the most durable portions of the wheelbarrow, i.e. the axle and rails.

With the present invention a quick attachment/detachment can be made to any towing vehicle. There is no additional hand operation required to install/remove a securing pin. Since the wheelbarrow is towed in a forward direction, it allows the user to simply grab the handles to attach/disconnect the wheelbarrow from the towing vehicle.

It should be obvious that changes, additions and omissions may be made in the details and arrangement of parts without departing from the spirit and scope of the invention as hereinafter claimed.

What is claimed is:

1. For attachment of a two-wheeled wheelbarrow to the rear of a towing vehicle with a vertically apertured draw bar, and thereby converting the two-wheeled wheelbarrow into a garden or industrial trailer, a combination comprising:

a wheelbarrow having a body with workman's end, dumping end and side walls, a frame including a pair of lower rails with lifting/transporting handles forward of the workman's end, extending and converging from forward of the workmen's end, beneath the body to the dumping end, a toe plate joining the rails at their dumping end and a pair of wheels mounted on an axle supported on the frame; and, a tow bar assembly comprising a bar having a forward end and a rearward end, the forward end having means for attachment to the towing vehicle from below to and through the towing vehicle vertically apertured draw bar and the rearward end having means for attachment about the wheelbarrow axle, the tow bar resting upon the wheelbarrow toe plate during use.

2. The combination of claim 1 including a plate affixed to the rails at the dumping end of the wheelbarrow over the toe plate upon which the bar rests during use.

3. The combination of claim 1 including a pair of grommets for mounting on the wheelbarrow axle for centering the tow bar thereon.

4. For attachment of a two-wheeled wheel barrow to the rear of a towing vehicle with a vertically apertured draw bar, and thereby converting the two-wheeled wheelbarrow into a garden or industrial trailer, a combination comprising:

a wheelbarrow having a body with workman's end, dumping end and side walls, a frame including a pair of lower rails with lifting/transporting handles forward of the workman's end, extending and converging from forward of the workmen's end, beneath the body to the dumping end, a toe plate joining the rails at their dumping end and a pair of wheels mounted on an axle supported on the frame; and, a tow bar assembly comprising a bar of channel shaped metal having a forward end and a rearward end, the forward end having a vertical post for attachment to the towing vehicle from below to and through the vertically apertured draw bar and the rearward end having an opening therethrough for attachment about the wheelbarrow axle, the tow bar resting upon the wheelbarrow toe plate during use.

5. The combination of claim 4 including a plate affixed to the rails at the dumping end of the wheelbarrow over the toe plate upon which the bar rests during use.

6. The combination of claim 4 including a pair of grommets for mounting on the wheelbarrow axle for centering the tow bar thereon.

7. For attachment of a two-wheeled wheel barrow to the rear of a towing vehicle with a vertically apertured draw bar, and thereby converting the two-wheeled wheelbarrow into a garden or industrial trailer, a combination comprising:

a wheelbarrow having a body with workman's end, dumping end and side walls, a frame including a pair of lower rails with lifting/transporting handles forward of the workman's end, extending and converging from forward of the workmen's end, beneath the body to the dumping end, a toe plate joining the rails at their dumping end and a pair of wheels mounted on an axle supported on the frame; and, a tow bar assembly, comprising a bar of channel shaped metal having a forward end and a rearward end, the forward end having vertical openings and a vertical post secured therein for attachment to the towing vehicle from below to and through the towing vehicle vertically apertured draw bar and the rearward end having horizontal openings therethrough for attachment about the wheelbarrow axle, the tow bar resting upon the wheelbarrow toe plate during use.

8. The combination of claim 7 including a plate affixed to the rails at the dumping end of the wheelbarrow over the toe plate upon which the bar rests during use.

9. The combination of claim 7 including a pair of grommets for mounting on the wheelbarrow axle for centering the tow bar thereon.

* * * * *